(No Model.)
G. R. DYKES.
CORN OR SEED DROPPER.
No. 604,738. Patented May 31, 1898.
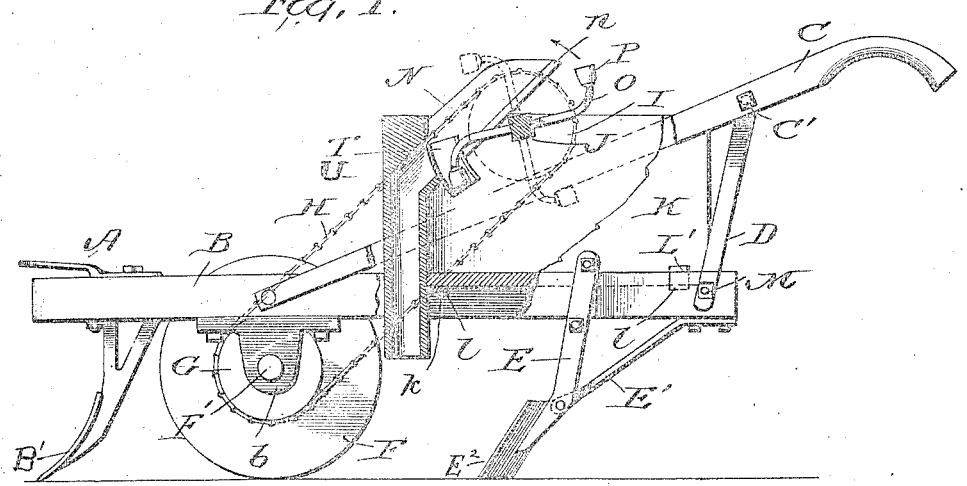
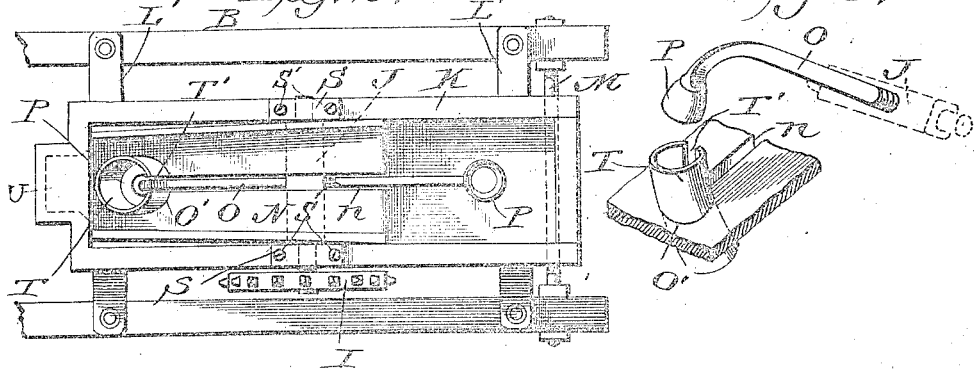
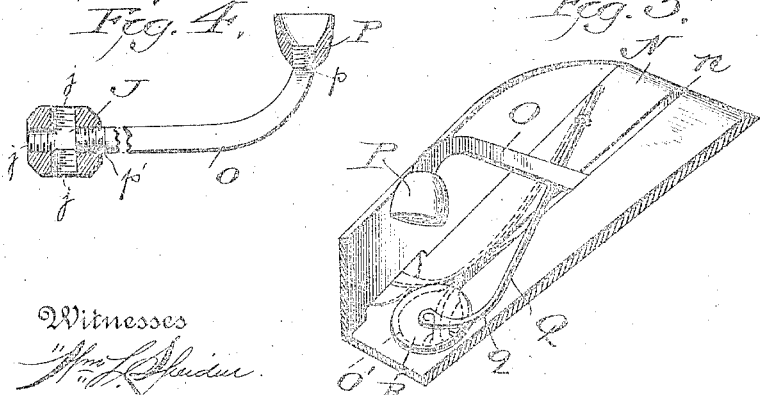
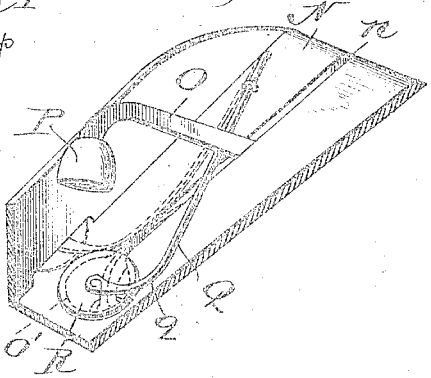
Witnesses
Inventor
Geo. R. Dykes
by
W. H. Babcock
Attorney

UNITED STATES PATENT OFFICE.

GEORGE R. DYKES, OF HAWKINSVILLE, GEORGIA.

CORN OR SEED DROPPER.

SPECIFICATION forming part of Letters Patent No. 604,738, dated May 31, 1898.

Application filed November 29, 1897. Serial No. 660,127. (No model.)

*To all whom it may concern:*

Be it known that I, GEORGE R. DYKES, a citizen of the United States, residing at Hawkinsville, in the county of Pulaski and State of Georgia, have invented certain new and useful Improvements in Corn-Planters and Seed-Droppers; and I do hereby declare the following to be a full, clear, and exact description of the invention, such as will enable others skilled in the art to which is appertains to make and use the same.

The object of this invention is to provide a satisfactory planter for corn, peanuts, field-peas, and other seeds, the same being adapted to drop any number of such seed, the number varying, according to adjustment of the machine, at intervals variable at will, and operating by means of a rotary shaft carrying arms and cups that dip the seed out of the seedbox and deposit it in the seed-tube as they revolve, a cut-off being provided to insure the delivery of the full charge of seed into the said seed-tube and prevent any of it from following the cup into the seedbox.

To this end my invention consists in the construction and combination of parts hereinafter set forth and claimed.

In the accompanying drawings, Figure 1 represents a vertical central longitudinal section of a seed-dropping machine embodying my invention. Fig. 2 represents a plan view of the same, on a larger scale, omitting handles and forward part. Fig. 3 represents a detail perspective view of the cut-off tube, a part of the spout or chute, and one of the cups and arms, the shaft being indicated in dotted lines. Fig. 4 represents a detail view of the shaft and one of the cup-rods with its cup, the shaft and cup being shown in section; and Fig. 5 represents a detail perspective view of one of the cups and arms, a part of the spout or chute, and the cut-off disk R and spring Q, which may be used in place of the cut-off tube T.

A designates the draft-hook; B, the frame; B', the furrow-opening plowshare, and C the handles of the machine, which is operated after the fashion of a plow. These handles are connected by a cross-bar C' and supported by upright bars or posts D, their lower forward ends being fastened to the said frame. To the side bars of the frame the standards E of a furrow coverer or coverers E² are bolted, these being also provided with rear braces E'. The lower ends of the bars or posts D are fastened to the frame by a transverse bracing-bolt M, which also supports the rear end of the seedbox K. This box is set and held by screws $k$ in the depressed middle parts $l$ of cross-bars L', which are detachably fastened on the said frame by bolts and nuts $l'$ or equivalent means. A feed-cup shaft J turns in bearings in the top of the said seedbox, being arranged across the line of travel of the machine and is held in place by cap-plates S, fastened removably to the box by screws S'. The said shaft has a sprocket-wheel I fast on it outside of the seedbox, this wheel being driven by an endless chain H from another sprocket-wheel G, which is fast on the rotary shaft F' of the driving-wheel F, turning by contact with the soil immediately behind the furrow-opening plow-point B'. This shaft F' is journaled in bearings $b$, attached to the under side of frame B. The seed-tube U is attached to the forward end of the seedbox K and communicates at the top with the interior thereof a little below the level of the said shaft. A spout or chute N, arranged in an inclined position within the forward part of the said box, directs the seed into the said tube. This spout has a central longitudinal slot $n$, extending from the top down to an opening O, which allows the seed-cups P to pass through the spout in their revolution after they have discharged successively their charges of seed. These cups are screw-tapped and turned like nuts on the screw-threaded ends $p$ of their supporting-rods O, the inner ends $p'$ of the said rods being also screw-threaded to turn into the recesses or sockets $j$, which are screw-tapped at regular radial intervals in the shaft J.

A cut-off is provided for insuring the delivery of the entire charge of each cup into the seed-tube U. This cut-off may be a slotted tube T, having a curvature of the same radius as the circle described by the cups in their revolution and fastened at its middle in the opening O', as shown in Figs. 1, 2, and 3, this tube being of sufficient internal diameter to allow the passage of the cups through it without friction, the longitudinal slot T' in the inner side of the said tube and the corresponding slot $n$ in the spout N permitting the rods O to turn with the shaft J, or the cut-off may be a disk R, normally held over the opening O' by a spring Q, Fig. 5, to which it is attached. This spring is secured to the spout N and bent at $g$, said spring being normally inclined across the slot $n$, so that each arm O will successively come in contact with it immediately after the seed-cup has delivered its charge and will then force the said spring and disk to one side, uncovering the opening O' for the cup to pass through into the seed-box again, after which the said spring moves the said disk into position over the opening again.

As the machine is drawn forward the rotation of its driving-wheel F, being transmitted to its seed-cup shaft J, causes the cups P to successively dip the seed from the seedbox K and discharge it into the seed-tube through the lower end of the spout. Any seed which may fall from the cup at any point of its revolution after it has come above the top of the spout will pass down the latter to the seed-tube. When the regulating-tube T is used, it occupies only the middle part of the width of the spout and the seed passes down the spout at the sides of the said tube, all being discharged before the cup enters the latter. Of course the seed cannot follow the cup into the tube, as the upper end of the latter rises above the spout and the slot T' is too narrow to admit any of it. The slot $n$ is also too narrow to let any of the seed pass down into the seedbox through the spout or chute.

The detachability of the seed-cups allows a larger or smaller cup to be substituted at any time for that before used to vary the charge or adapt the machine to be used with a different kind of seed. The detachability of the arms O from the shaft allows the number of cups in use to be varied, thereby increasing or decreasing the intervals between the hills.

This machine will accurately drop one grain of corn in a hill. It will drop peanuts without breaking the skin. It will drop seeds of any kind. It requires no forcing devices and has practically no friction of parts within the seedbox or spout. The detachability of the cup-shaft from the seedbox, of the latter from its supporting-bars, and of the said bars from the machine-frame greatly facilitates the work of cleaning and repairing.

Having thus described my invention, what I claim as new, and desire to secure by Letters Patent, is—

1. In combination with the frame of a seed-dropper, a driving-wheel journaled in the front part thereof, a seedbox carried by the said frame, a seed-tube connected to said box and arranged to drop the seed behind the said wheel, a spout or chute within the said box discharging into the upper end of the said tube and provided with a slot extending downward from the top and ending in an opening, a shaft journaled in said feed-box, a cup-rod and cup carried by the said shaft and adapted to pass through the said slot and opening, gearing which connects the said shaft with the rotary shaft of the driving-wheel and a cut-off which prevents the seed from falling through the said opening from the cup substantially as set forth.

2. In combination with the seedbox of a seed-dropping machine, a rotary shaft mounted in the said box, a cup or cups carried thereby and arranged to dip up the seed and discharge the same, a spout and seed-tube through which the seed from the said cup is dropped by the machine the said spout being slotted and having an opening for the passage of the said cup, and a slotted cut-off tube arranged in the said opening to extend above the same, this tube being adapted to allow the passage of the cup through it as the latter is carried around by the shaft substantially as set forth.

3. In combination with the seedbox of a seed-dropping machine having a seed-tube connected thereto, a rotary shaft and a cup-rod and cup carried thereby, the said cup being arranged to dip up seed from the interior of the said box and discharge it into the said tube, and being removable at will from the said rod for the purpose of allowing the substitution of a cup of different size substantially as set forth.

4. In combination with the seedbox of a seed-dropping machine having a seed-tube connected thereto a rotary shaft and cup-rods and cups carried thereby, the cups being arranged and adapted to successively dip up the seed and discharge it into the seed-tube and the said rods being detachable from the said shaft, which is provided at regular intervals with means for permitting the attachment of a greater or less number at will substantially as set forth.

5. In a seed-dropping machine, a cup-rod which is screw-threaded on its ends, in combination with a shaft and seed-cup which are screw-tapped to receive the said ends, a seed-box in which the said shaft rotates to cause the said cup to dip up and discharge the seed, and means for allowing the seed thus discharged to pass from the machine substantially as set forth.

6. In combination with a seedbox and a spout leading to the outlet, a rotary shaft screw-tapped at regular radial intervals, a series of rods adapted to screw into the said shaft in greater or less number and a series of screw-tapped cups adapted to turn on the threaded outer ends of the said rods, in order that larger or smaller cups may be substituted, the said cups and rods being carried through a slot and opening in the said spout as the said shaft rotates, for the purpose set forth.

7. In combination with the frame of a seed-dropper, a pair of bars or plates detachably secured thereto and depressed between the side bars of the said frame, a seedbox fastened rigidly but detachably to the said bars and resting in the depressed part thereof, a shaft journaled in the said seedbox and provided with cups which dip up the seed therefrom, a spout or chute and seed-tube whereby the seed is received from the said cups and dropped and a driving-wheel and gearing whereby the said shaft is rotated substantially as set forth.

In testimony whereof I affix my signature in presence of two witnesses.

GEORGE R. DYKES.

Witnesses:
ELI W. GOODE,
J. L. GRACE.